United States Patent
Han et al.

(10) Patent No.: US 7,680,575 B2
(45) Date of Patent: Mar. 16, 2010

(54) SELECTING TRANSMISSION RATIO BASED ON PERFORMANCE DRIVABILITY AND FUEL ECONOMY

(75) Inventors: Ed E. Han, Ann Arbor, MI (US); Joseph L. Wanamaker, Tecumseh, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 691 days.

(21) Appl. No.: 11/031,397

(22) Filed: Jan. 7, 2005

(65) Prior Publication Data

US 2006/0155453 A1    Jul. 13, 2006

(51) Int. Cl.
*G06F 7/00* (2006.01)
(52) U.S. Cl. ................ 701/51; 701/55; 701/56
(58) Field of Classification Search ........... 701/51, 701/55, 56
See application file for complete search history.

(56) References Cited

U.S. PATENT DOCUMENTS

| | | | | |
|---|---|---|---|---|
| 5,410,476 | A * | 4/1995 | Iizuka | 701/56 |
| 5,441,449 | A * | 8/1995 | Hart | 451/72 |
| 5,954,777 | A * | 9/1999 | Cao et al. | 701/51 |
| 6,012,009 | A * | 1/2000 | Kronenberg et al. | 701/56 |
| 6,487,485 | B1 * | 11/2002 | Henneken et al. | 701/56 |
| 6,814,687 | B2 * | 11/2004 | Jager et al. | 477/83 |
| 6,862,510 | B2 * | 3/2005 | Vornehm | 701/51 |
| 2005/0090963 | A1 * | 4/2005 | Kuhn et al. | 701/56 |
| 2006/0149550 | A1 * | 7/2006 | Salminen | 704/270.1 |
| 2007/0083315 | A1 * | 4/2007 | Takamatsu et al. | 701/90 |

* cited by examiner

*Primary Examiner*—Mark Hellner

(57) ABSTRACT

A transmission control system for a vehicle includes a driver input device that generates a driver input signal and a control module that receives the driver input signal. The control module determines an operating mode of a transmission based on the driver input signal and selects a gear ratio of the transmission based on the operating mode. The operating mode includes one of a maximum performance mode, a power mode and a fuel economy mode.

21 Claims, 6 Drawing Sheets

SELECTING TRANSMISSION RATIO BASED ON PERFORMANCE DRIVABILITY AND FUEL ECONOMY

FIELD OF THE INVENTION

The present invention relates to transmission control, and more particularly to selecting a transmission ratio based on performance, drivability and fuel economy.

BACKGROUND OF THE INVENTION

Internal combustion engines produce drive torque that is transferred to a drivetrain. The drive torque is transferred through a transmission that multiplies the drive torque by a gear ratio. Transmissions generally include multiple gear ratios through which the drive torque is transferred. Automatic transmissions automatically shift between gear ratios based on driver input and vehicle operating conditions.

Traditional transmission control systems determine shift decisions based on vehicle speed and throttle. The shift strategy is developed based on vehicle performance, drivability and fuel economy based on anticipated driving conditions. The shift strategy also must account for engine sub-systems (e.g., variable valve timing (VVT)) and other features including, but not limited to, powertrain braking, GPS-based shifting and hybrid vehicle functions. As a result, traditional transmission control systems are more complex than desired and require significant time to calibrate.

SUMMARY OF THE INVENTION

Accordingly, the present invention provides a transmission control system for a vehicle. The transmission control system includes a driver input device that generates a driver input signal and a control module that receives the driver input signal. The control module determines an operating mode of a transmission based on the driver input signal and selects a gear ratio of the transmission based on the operating mode. The operating mode includes one of a maximum performance mode, a power mode and a fuel economy mode.

In other features, the operating mode is the maximum performance mode when the driver input signal exceeds a maximum performance threshold. The operating mode is the power mode when the driver input position value exceeds a power threshold and is below a maximum performance threshold.

In another feature, when in the maximum performance mode, the control module calculates a vehicle acceleration, determines whether the vehicle acceleration can be achieved in a lower gear and down-shifts the transmission to the lower gear when the vehicle acceleration can be achieved in the lower gear.

In other features, when in the maximum performance mode, the control module determines a target engine speed for a current gear ratio and up-shifts the transmission when the engine speed approaches the target engine speed. The control module predicts a future engine speed and up-shifts the transmission when the future engine speed is equal to the target engine speed. The target engine speed is a redline speed of an engine that drives said transmission.

In another feature, when in the power mode, the control module determines a current engine speed and up-shifts the transmission when the current engine speed exceeds an up-shift threshold. The control module predicts a future engine speed for a lower gear ratio and down-shifts the transmission when the future engine speed is below a down-shift threshold.

In other features, when in the fuel economy mode, the control module determines an acceleration reserve for a current gear ratio and shifts the transmission based on the acceleration reserve. The acceleration reserve is determined as a difference between a maximum acceleration achievable in the current gear ratio and a driver requested acceleration.

In still other features, the control module determines a driver torque request based on said driver input signal and determines the operating mode based on the driver torque request. The operating mode includes one of a maximum performance mode, a power mode, a coast mode and a fuel economy mode.

In other features, the operating mode is the coast mode when the driver torque request is below a coast threshold. When in the coast mode, the control module predicts a first transmission input speed based on a down-shift and predicts a second transmission input speed based on an up-shift. The control module down-shifts the transmission when the first transmission input speed is larger than the engine speed and up-shifts the transmission when the second transmission input speed is less than the engine speed.

In yet another feature, the fuel economy mode is a default mode when not operating the transmission in one of the maximum performance mode, the power mode and the coast mode.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
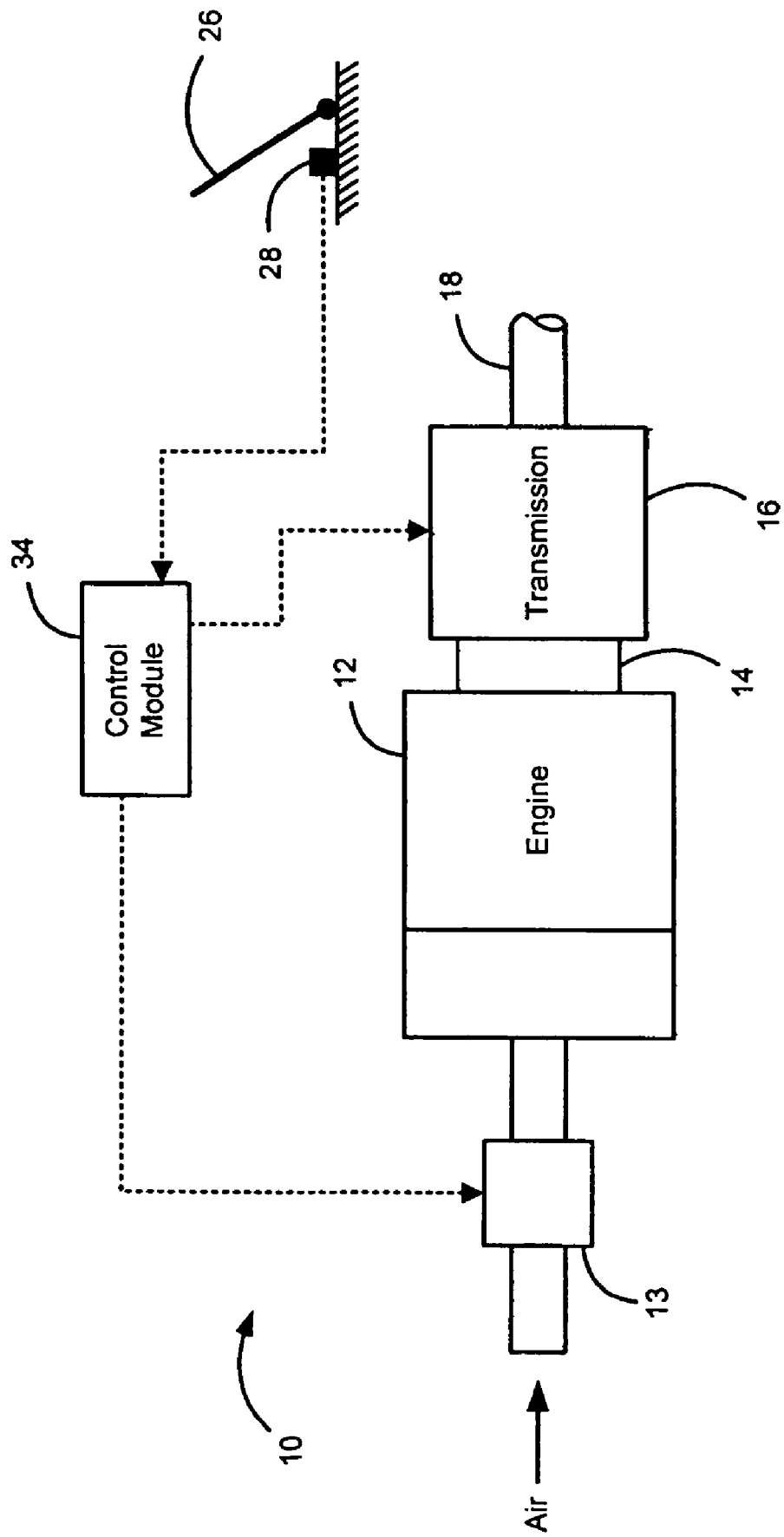
FIG. 1 is a schematic illustration of an exemplary vehicle that is operated based on the transmission control system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, a vehicle 10 includes an engine 12 that combusts an air and fuel mixture to produce drive torque. Air is drawn into the engine through a throttle 13. The drive torque is transferred through a torque converter 14 and a transmission 16 to drive a driveline 18. The transmission 16 is preferably an automatic transmission that transfers the drive torque through one of a plurality of gear ratios (e.g., 3-speed, 4-speed, 5-speed, 6-speed and the like). The gear ratio is determined based on the transmission control system of the present invention.

A control module 34 operates the transmission 16 based on the transmission control of the present invention. An accelerator pedal 26 is provided and enables a driver to indicate a desired engine torque output. More specifically, a position sensor 28 is responsive to a position of the accelerator pedal 26. The position sensor 28 generates a position signal that indicates the desired engine torque output. The control module 34 receives the position signal from the accelerator pedal position sensor 28 and processes the signal to determine an operating mode of the transmission 16. The operating modes include a maximum performance (MP) mode, a power (P) mode, a coast (C) mode and a fuel economy (FE) mode. The control module 34 generates shift signals (i.e., up-shift, down-shift) based on the particular operating mode, as explained in further detail below. Although the present description describes the maximum performance, power, coast and fuel economy modes in detail, it is appreciated that the transmission control system of the present invention can be expanded to include other operating modes including, but not limited to, a tap-up/tap-down mode and a driver shift selection mode.

The particular mode is determined based on the accelerator pedal position ($P_{PEDAL}$). More specifically, the transmission 16 is operated in the maximum performance mode when $P_{PEDAL}$ exceeds a threshold ($P_{MPMTHR}$). The transmission 16 is operated in the power mode when $P_{PEDAL}$ exceeds a threshold ($P_{PMTHR}$) and is below $P_{MPMTHR}$. The control module 34 determines the desired engine torque output ($T_{DES}$) based on $P_{PEDAL}$. The transmission 16 is operated in the coast mode when $T_{DES}$ is below a torque threshold ($T_{CMTHR}$). The transmission 16 is operated in the fuel economy mode when no other mode is selected. In this manner, the fuel economy mode is the default operating mode.

The maximum performance mode is selected during wide-open throttle (WOT) maneuvers. In the maximum performance mode, shifts are based on engine speed (N). More specifically, up-shifts occur at the engine speed limit or redline to realize maximum tractive energy over time. The control module 34 determines a target engine speed ($N_{TARGET}$) for the current gear ratio. As the vehicle accelerates, the control module 34 predicts the engine speed for the next time step. The control module 34 initiates an up-shift when the predicted engine speed is equal to $N_{TARGET}$. In this manner, N achieves $N_{TARGET}$ at the time the up-shift occurs. For down-shifts, the control module 34 calculates the current vehicle acceleration ($a_{VEH}$) and initiates a down-shift if $a_{VEH}$ can be achieved using the next lowest gear ratio.

The power mode is selected when the driver commands high power, but the accelerator pedal is not fully depressed. The engine can not deliver much more power when its manifold absolute pressure (MAP) approaches atmospheric pressure at a given RPM, even though the throttle is not fully open. In such situations, the engine power can only be regulated through RPM or a gear shift. A driver expects the desired engine power reflected by the engine speed to be proportional to the accelerator pedal position.

In the power mode, the current engine speed (N) and a predicted engine speed after a down-shift ($N_{PRED}$) are used to determine whether an up-shift or a down-shift are desired. $N_{PRED}$ is calculated from a model of the engine system including torque converter characteristics. If N is above an up-shift threshold ($N_{U/STHR}$), an up-shift occurs. If $N_{PRED}$ is below a down-shift threshold ($N_{D/STHR}$), a down-shift occurs. $N_{U/STHR}$ and $N_{D/STHR}$ are determined based on pedal positions and gear ratio (e.g., calculated or using a look-up table). $N_{U/STHR}$ is shift dependent to account for the fact that the engine needs to be at a higher RPM to provide more power at high speeds and driver perception of power is biased by the vehicle noise at high speeds. Because $N_{PRED}$ accounts for engine torque and torque converter characteristics, engine or torque converter changes can be made without impacting the transmission operation in the power mode. An additional benefit is the ability to maintain engine performance characteristics without calibration changes for changes in transmission ratio, including sprocket and final drive ratios, tire rolling radius and torque converters.

When the $T_{DES}$ is below $T_{CMTHR}$ (e.g., driver is requesting zero or negative tractive torque), the transmission 16 is operated in the coast mode. In the coast mode, the vehicle coast performance and driveability are the major gear ratio selection criteria. If the transmission 16 has powertrain braking capability, powertrain braking control can be implemented. An exemplary powertrain braking control is described in detail in commonly assigned U.S. Pat. No. 6,625,535, entitled Adaptive Powertrain Braking Control with Grade, Mass and Brake Temperature and issued on Sep. 23, 2003, the disclosure of which is expressly incorporated herein by reference. If powertrain braking control is not implemented, the coast mode matches the transmission input speed ($W_{INP}$) to the engine idle speed ($N_{IDLE}$). More specifically, the control module predicts the transmission input speeds for an up-shift ($W_{INPU/S}$) and a down-shift ($W_{INPD/S}$). The prediction accounts for shift time and vehicle acceleration.

When multiple gear ratios are capable of delivering the driver commanded performance and no other mode has been selected, the transmission 16 is operated in the fuel economy mode. An acceleration reserve ($a_{RES}$) is the additional vehicle acceleration, beyond what is commanded by the driver, that the powertrain is capable of delivering without a gear shift. $a_{RES}$ is determined as the difference between the maximum acceleration ($a_{MAX}$) for the current gear ratio and a driver requested acceleration ($a_{REQ}$). $a_{RES}$ is compared to an up-shift threshold ($a_{RESU/STHR}$) and a down-shift threshold ($a_{RESD/STHR}$) to determine whether an up-shift or a down-shift is to occur. $a_{RESU/STHR}$ and $a_{RESD/STHR}$ are determined from a look-up table based on vehicle speed and accelerator pedal position. When multiple gear ratios meet $a_{RESU/STHR}$, the gear that consumes the least amount of fuel will be selected. However, if the current $a_{RES}$ is less than $a_{RESD/STHR}$, the gear that consumes the least amount of fuel and that would yield an $a_{RES}$ that is closest to zero will be selected.

Exiting a particular operating mode is determined based on the accelerator pedal position signal and $T_{DES}$. More specifically, when in a particular operating mode that is based on accelerator pedal position (i.e., maximum performance mode and power mode), exiting that mode can be achieved by the accelerator pedal position going below the entrance threshold (i.e., $P_{MPMTHR}$ and $P_{PMTHR}$) or going below an exit threshold that is generally lower than the entrance threshold. Similarly, when in a particular operating mode that is based on $T_{DES}$ (i.e., coast mode), exiting that mode can be achieved by $T_{DES}$ going below the entrance threshold (i.e., $T_{CMTHR}$) or going below an exit threshold that is generally lower than the entrance threshold. Alternatively, exiting the particular operating mode can be achieved by the corresponding signal (i.e., accelerator pedal position or $T_{DES}$) remaining below a corresponding threshold for a predetermined period of time. In this manner, the transmission control system does not repeatedly switch in and out of operating modes. The transmission control system exits the fuel economy mode upon entering any one of the other modes.

Figure 2:
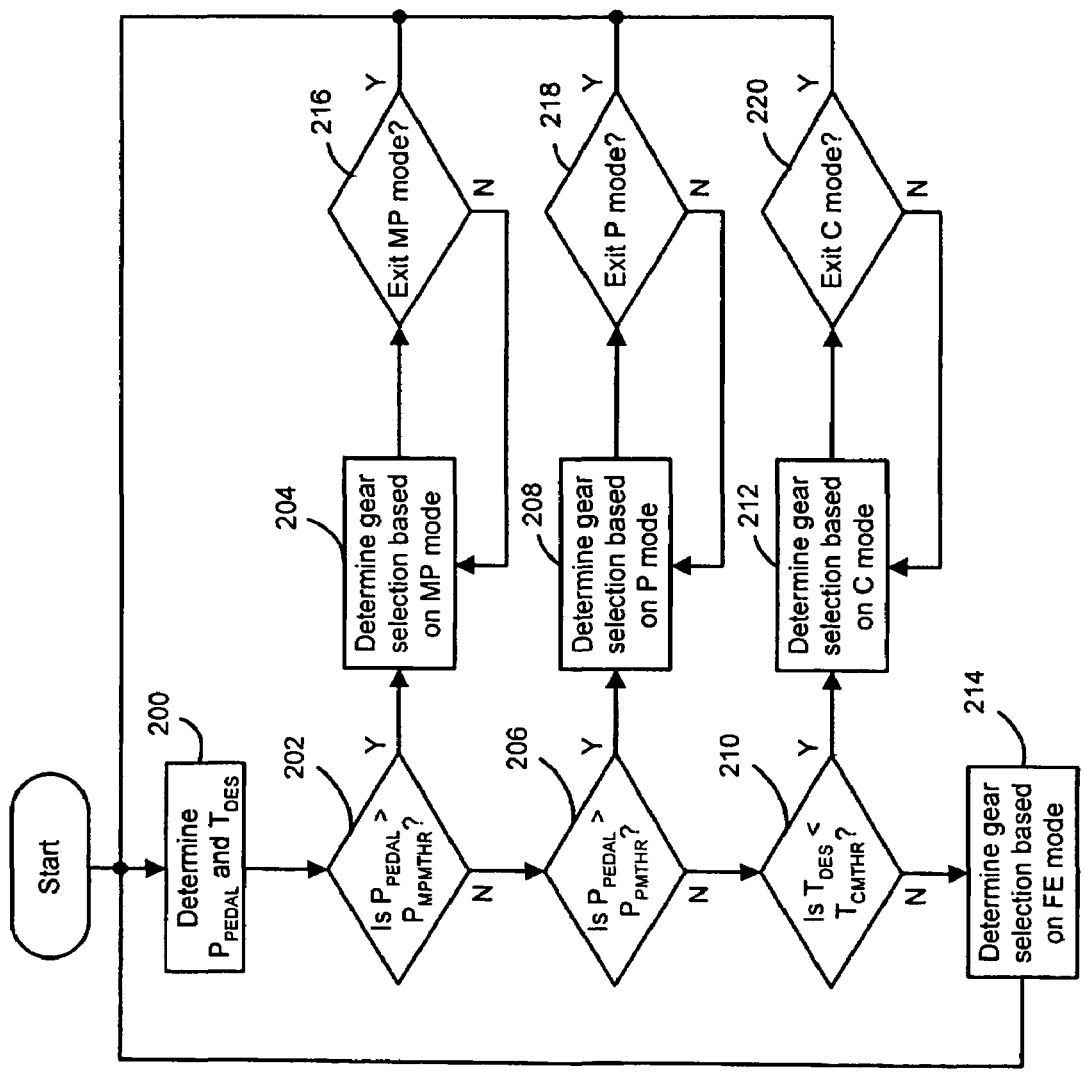
FIG. 2 is a flowchart illustrating steps performed by the transmission control system of the present invention to determine an operating mode of a transmission.

Referring now to FIG. 2, the mode selection steps performed by the transmission control system will be described in detail. In step 200, control determines $P_{PEDAL}$ and $T_{DES}$. In step 202, control determines whether $P_{PEDAL}$ is greater than $P_{MPMTHR}$. If $P_{PEDAL}$ is greater than $P_{MPMTHR}$, control continues in step 204. If $P_{PEDAL}$ is not greater than $P_{MPMTHR}$, control continues in step 206. In step 206, control determines whether $P_{PEDAL}$ is greater than $P_{PMTHR}$. If $P_{PEDAL}$ is greater than $P_{PMTHR}$, control continues in step 208. If $P_{PEDAL}$ is not greater than $P_{PMTHR}$, control continues in step 210. In step 210, control determines whether $T_{DES}$ is less than $T_{CMTHR}$. If $T_{DES}$ is less than $T_{CMTHR}$, control continues in step 212. If $T_{DES}$ is not less than $T_{CMTHR}$, control operates the transmission 16 in the fuel economy mode in step 214 and loops back to step 200.

In step 204, control operates the transmission 16 in the maximum performance mode. Control determines whether to exit the maximum performance mode in step 216. If control does not exit the maximum performance mode, control loops back to step 204. If control does exit the maximum performance mode, control loops back to step 200. In step 208, control operates the transmission 16 in the power mode. Control determines whether to exit the power mode in step 218. If control does not exit the power mode, control loops back to step 208. If control does exit the power mode, control loops back to step 200. In step 212, control operates the transmission 16 in the coast mode. Control determines whether to exit the coast mode in step 220. If control does not exit the coast mode, control loops back to step 212. If control does exit the power mode, control loops back to step 200.

Figure 3:
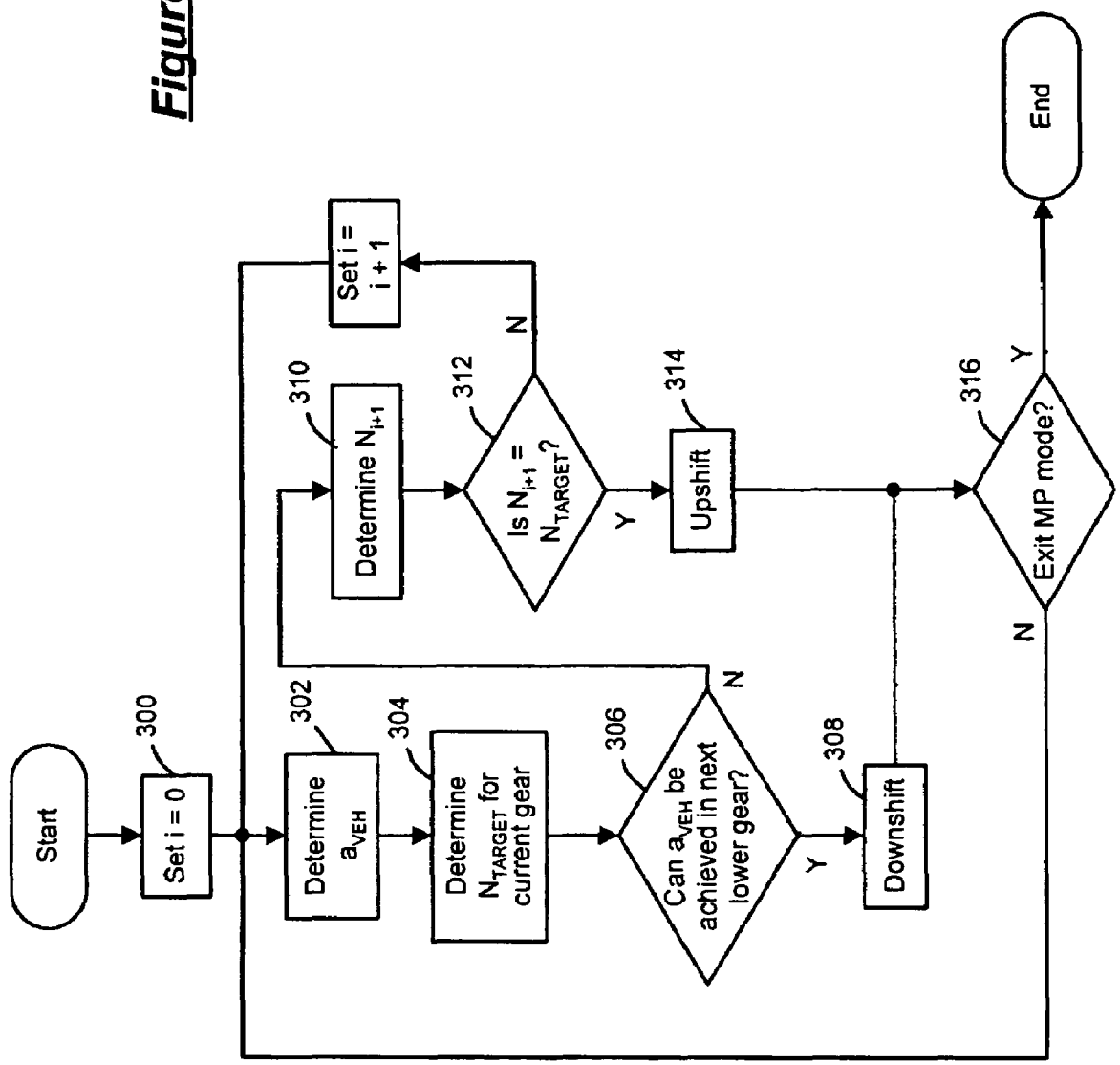
FIG. 3 is a flowchart illustrating steps performed by the transmission control system when operating the transmission in a maximum performance mode.

Referring now to FIG. 3, operation of the transmission 16 in the maximum performance mode will be described in detail. In step 300, control sets an interval counter (i) equal to 0. In step 302, control calculates $a_{VEH}$. Control determines $N_{TARGET}$ for the current gear ratio in step 304. In step 306, control determines whether $a_{VEH}$ can be achieved in the next lower gear ratio. If $a_{VEH}$ can be achieved in the next lower gear ratio, control down-shifts the transmission 16 in step 308. If $a_{VEH}$ can not be achieved in the next lower gear ratio, control continues in step 310.

In step 310, control calculates a future engine speed ($N_{i+1}$) for the next time interval. Control determines whether $N_{i+1}$ is equal to $N_{TARGET}$ in step 312. If $N_{i+1}$ is not equal to $N_{TARGET}$, control increments i by 1 in step 312 and loops back to step 302. If $N_{i+1}$ is equal to $N_{TARGET}$, control up-shifts the transmission 16 in step 314. In step 316, control determines whether to exit the maximum performance mode. If control determines to exit the maximum performance mode, control ends. If control does not determine to exit the maximum performance mode, control loops back to step 302.

Figure 4:
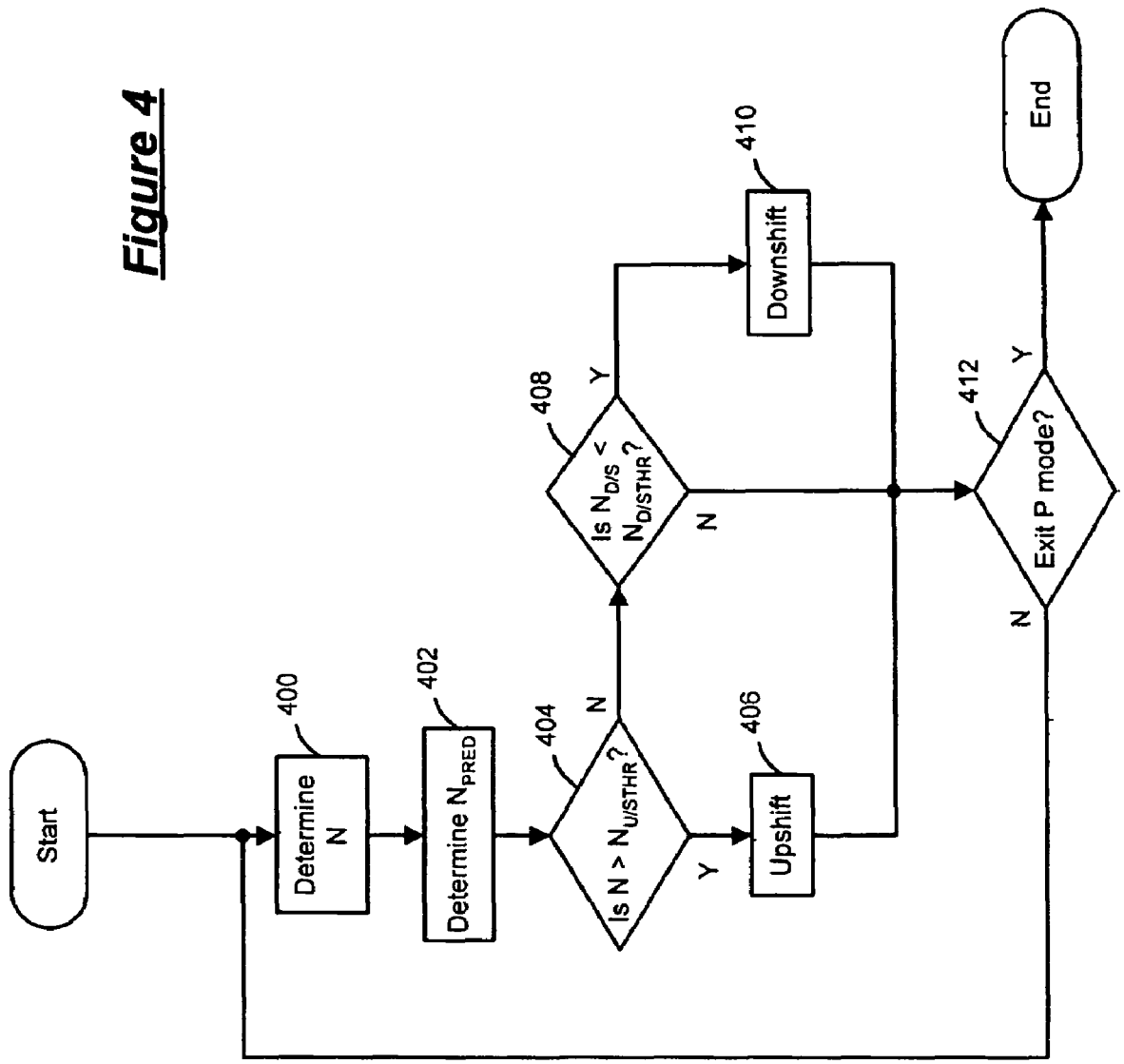
FIG. 4 is a flowchart illustrating steps performed by the transmission control system when operating the transmission in a power mode.

Referring now to FIG. 4, operation of the transmission 16 in the power mode will be described in detail. In step 400 control determines the engine speed (N). In step 402, control calculates $N_{PRED}$. Control determines whether N is greater than $N_{U/STHR}$ in step 404. If N is greater than $N_{U/STHR}$, control up-shifts that transmission 16 in step 406. If N is not greater than $N_{U/STHR}$, control determines whether $N_{PRED}$ is greater than $N_{D/STHR}$ in step 408. If $N_{PRED}$ is not greater than $N_{D/STHR}$, control down-shifts that transmission 16 in step 410. If N is greater than $N_{D/STHR}$, control continues in step 412. In step 412, control determines whether to exit the power mode. If control determines to exit the power mode, control ends. If control does not determine to exit the power mode, control loops back to step 400.

Figure 5:
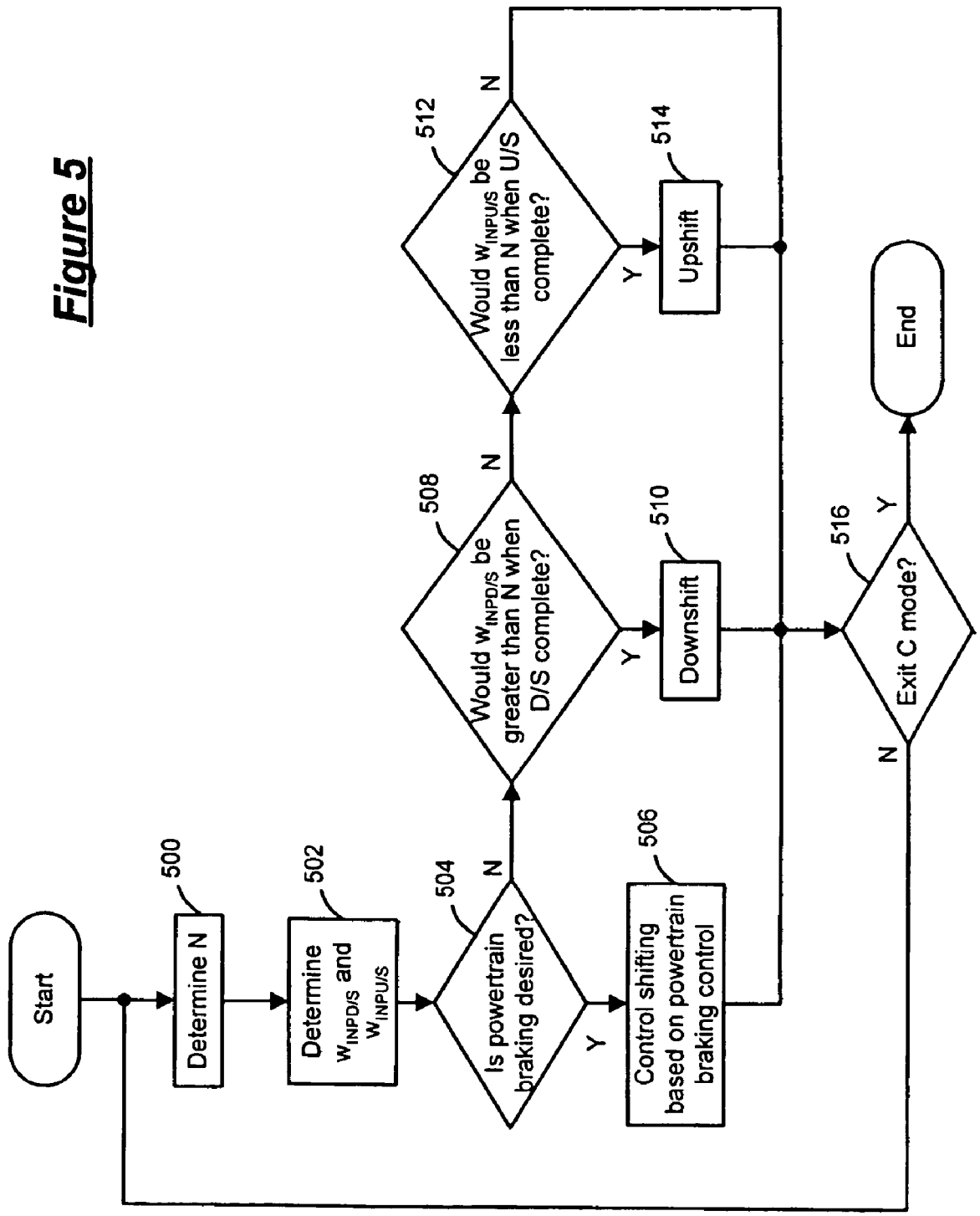
FIG. 5 is a flowchart illustrating steps performed by the transmission control system when operating the transmission in a coast mode.

Referring now to FIG. 5, operation of the transmission 16 in the coast mode will be described in detail. In step 500, control determines the current engine speed (N). In step 502, control calculates $W_{INPD/S}$ and $W_{INPU/S}$. Control determines whether powertrain braking is desired in step 504. If powertrain braking is desired, control shifts the transmission 16 based on the powertrain braking control in step 506. If powertrain braking is not desired, control continues in step 508.

In step 508, control determines whether $W_{INPD/S}$ would be greater than N if a down-shift occurred. If $W_{INPD/S}$ would be greater than N, control down-shifts the transmission 16 in step 510. If $W_{INPD/S}$ would not be greater than N, control determines whether $W_{INPU/S}$ would be less than N if an up-shift occurred in step 512. If $W_{INPU/S}$ would be less than N, control up-shifts the transmission 16 in step 514. If $W_{INPU/S}$ would not be less than N, control continues in step 516. In step 516, control determines whether to exit the coast mode. If control determines to exit the coast mode, control ends. If control does not determine to exit the coast mode, control loops back to step 500.

Figure 6:
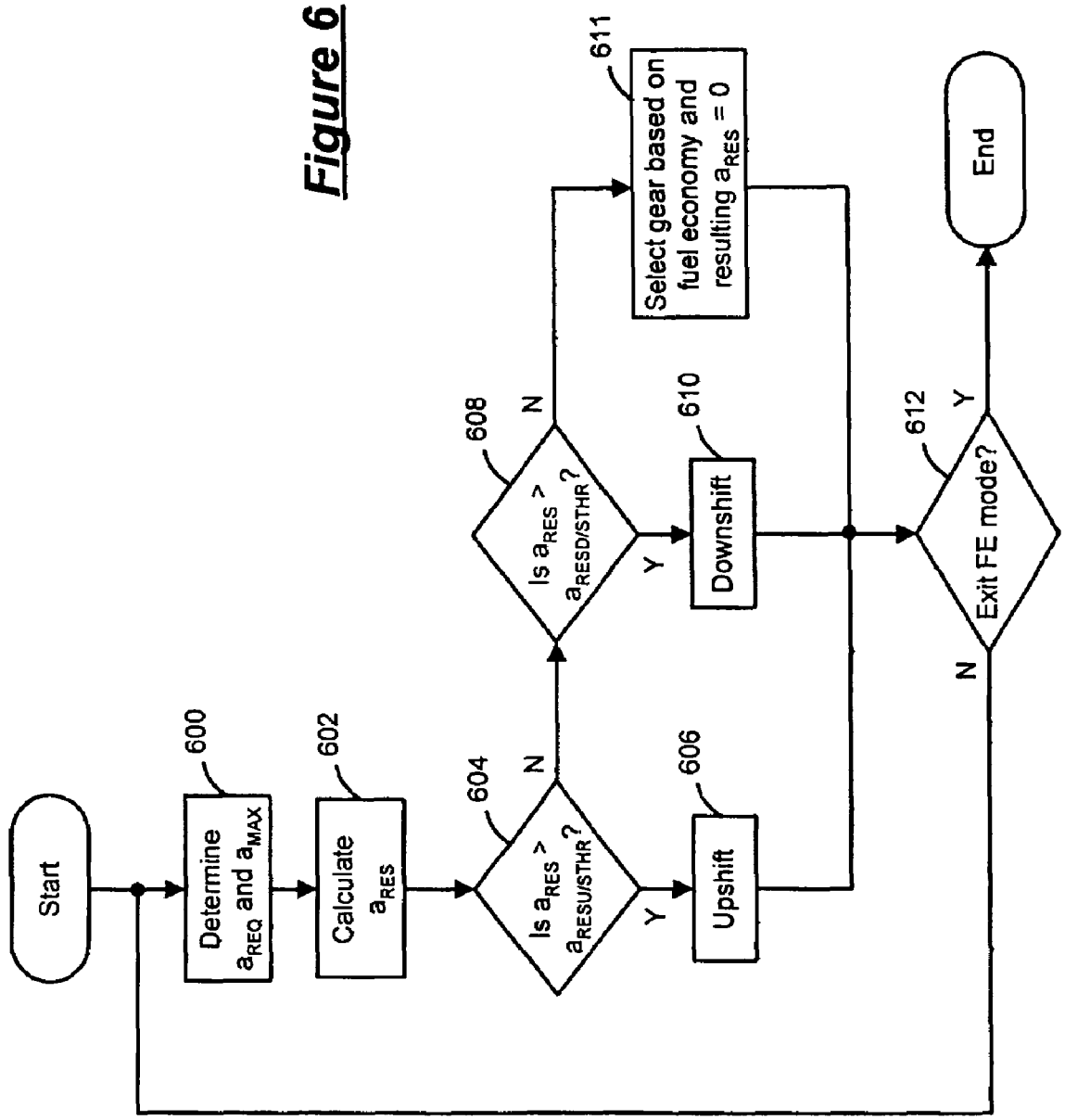
FIG. 6 is a flowchart illustrating steps performed by the transmission control system when operating the transmission in a fuel economy mode.

Referring now to FIG. 6, operation of the transmission 16 in the fuel economy mode will be described in detail. In step 600, control determines $a_{REQ}$ based on the driver input and $a_{MAX}$ based on the current gear ratio. In step 602, control calculates $a_{RES}$. Control determines whether $a_{RES}$ is greater than $a_{RESU/STHR}$ in step 604. If $a_{RES}$ is greater than $a_{RESU/STHR}$, control up-shifts the transmission 16 in step 606. As discussed in detail above, if multiple up-shift gears meet $a_{RESU/STHR}$, the gear that consumes the least amount of fuel will be selected. If $a_{RES}$ is not greater than $a_{RESU/STHR}$, control determines whether $a_{RES}$ is greater than $a_{RESD/STHR}$ in step 608. If $a_{RES}$ is greater than $a_{RESD/STHR}$, control down-shifts the transmission 16 in step 610. If $a_{RES}$ is not greater than $a_{RESU/STHR}$, control selects a gear that consumes the least amount of fuel and that would yield an $a_{RES}$ closest to zero in step 611. In step 612, control determines whether to exit the fuel economy mode. If control determines to exit the fuel economy mode, control ends. If control does not determine to exit the fuel economy mode, control loops back to step 600.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of determining a gear ratio of a transmission that has N gear ratios, where N is an integer, comprising:
   generating a driver input position value;
   selecting an operating mode of said transmission from a plurality of operating modes, each of said operating modes having different gear ratio selection criteria, based on said driver input position value, wherein said operating modes include a maximum performance mode, a power mode, a coast mode and a fuel economy mode;
   selecting to one of up-shift and down-shift said transmission;

determining M ones of said N gear ratios that satisfy gear ratio selection criteria of said selected operating mode and that are associated with said selected one of said up-shift and said down-shift, where M is an integer greater than 1 and less than or equal to N;

selecting a gear ratio of said M ones of said N gear ratios; and performing said selected one of said up-shift and said down-shift based on said selected gear ratio of said M ones of said N gear ratios.

2. The method of claim 1 wherein said operating mode is said maximum performance mode when said driver input position value exceeds a maximum performance threshold.

3. The method of claim 1 wherein said operating mode is said power mode when said driver input position value exceeds a power threshold and is below a maximum performance threshold.

4. The method of claim 1 wherein when in said maximum performance mode, the method further comprises:
calculating a vehicle acceleration;
determining whether said vehicle acceleration can be achieved in a lower gear; and
downshifting said transmission to said lower gear when said vehicle acceleration can be achieved in said lower gear.

5. The method of claim 1 wherein when in said maximum performance mode, the method further comprises:
determining a target engine speed for a current gear ratio; and
up-shifting said transmission when said engine speed approaches said target engine speed.

6. The method of claim 5 further comprising predicting a future engine speed, wherein said up-shifting when said future engine speed is equal to said target engine speed, wherein said target engine speed is a redline speed of an engine.

7. The method of claim 1 wherein when in said power mode, the method further comprises:
determining a current engine speed; and
up-shifting said transmission when said current engine speed exceeds an up-shift threshold.

8. The method of claim 1 wherein when in said power mode the method further comprises:
predicting a future engine speed for a lower gear ratio; and
down-shifting said transmission when said future engine speed is below a down-shift threshold.

9. The method of claim 1 wherein when in said fuel economy mode, the method further comprises:
determining an acceleration reserve for a current gear ratio; and
shifting said transmission based on said acceleration reserve,
wherein said acceleration reserve is determined as a difference between a maximum acceleration in said current gear ratio and a driver requested acceleration.

10. The method of claim 1 further comprising:
generating a driver torque request; and
determining said operating mode based on said driver torque request.

11. The method of claim 10 wherein said operating mode is said coast mode when said driver torque request is below a coast threshold.

12. The method of claim 1 wherein when in said coast mode, the method further comprises:
predicting a first transmission input speed based on a down-shift;
predicting a second transmission input speed based on an up-shift;
down-shifting said transmission when said first transmission input speed is greater than an engine speed; and
up-shifting said transmission when said second transmission input speed is less than said engine speed.

13. The method of claim 1 wherein said fuel economy mode is a default mode when not operating said transmission in one of said maximum performance mode, said power mode and said coast mode.

14. The method of claim 1 wherein said selected gear ratio is selected based on fuel economy provided in each of said M ones of said N gear ratios.

15. The method of claim 1 further comprising determining at least one of a target engine speed, a torque value and an acceleration value based on said driver input position value,
wherein said selected gear ratio is selected based on at least one of said target engine speed, said torque value and said acceleration value.

16. The method of claim 1 further comprising determining at least one of a maximum acceleration value, a acceleration reserve value, a fuel economy value, a predicted engine speed value, and a predicted acceleration value for each of said M ones of said N gear ratios based on said driver input position value,
wherein said selected gear ratio is selected based on at least one of said maximum acceleration value, said acceleration reserve value, said fuel economy value, said predicted engine speed value, and said predicted acceleration value.

17. The method of claim 1 further comprising determining at least one of a maximum acceleration value, a acceleration reserve value, and a fuel economy value for each of said M ones of said N gear ratios based on said driver input position value,
wherein said selected gear ratio is selected based on at least one of said maximum acceleration value, said acceleration reserve value, and said fuel economy value.

18. The method of claim 1 wherein first criteria of said operating modes includes engine speed thresholds, and
wherein second criteria of said operating modes includes acceleration thresholds.

19. The method of claim 18 wherein said first criteria correspond with one of said maximum performance mode, said power mode, and said coast mode, and
wherein said second criteria correspond with said fuel economy mode.

20. The method of claim 1 wherein said selecting to one of up-shift and down-shift said transmission is based on a comparison between an acceleration reserve value for a current gear ratio and at least one of an up-shift threshold and a down-shift threshold.

21. The method of claim 20 wherein acceleration reserve values associated with each of said M gear ratios is greater than an up-shift threshold when performing an up-shift, and
wherein acceleration reserve values associated with each of said M gear ratios is greater than a down-shift threshold when performing a down-shift.

* * * * *